United States Patent [19]
Clavel

[11] Patent Number: 5,966,439
[45] Date of Patent: Oct. 12, 1999

[54] MODULAR TELEPHONE LINE CONNECTING DISCONNECTING AND TESTING BLOCK

[75] Inventor: Juan Vives Clavel, Albuixech, Spain

[73] Assignee: Plasticos Mondragon, S.A., Spain

[21] Appl. No.: 08/829,330

[22] Filed: Mar. 31, 1997

[30] Foreign Application Priority Data

May 28, 1996 [ES] Spain .................................... 9601456

[51] Int. Cl.$^6$ ............................. H04M 1/00; H04M 3/00
[52] U.S. Cl. ............................................ 379/399; 379/329
[58] Field of Search ..................................... 379/399, 419, 379/442, 428, 327, 328, 329; 361/426, 356, 334, 428

[56] References Cited

U.S. PATENT DOCUMENTS 4,932,051  6/1990  Karen et al. ............................. 379/399

*Primary Examiner*—Jack Chiang
*Attorney, Agent, or Firm*—Schweitzer Cornman Gross & Bondell LLP

[57] ABSTRACT

A modular block for connecting, disconnecting and testing a telephone line, including a plurality of conductor holders each for connecting, or for disconnecting an insulated subscriber wire pair, a plurality of removable elements for providing a connection to an insulated subscriber wire pair, and for manually establishing or cutting the connection between a subscriber wire pair and a conductor holder, at least five, or a plurality of five connecting units each including one of the conductor holders for connecting a subscriber wire pair to a removable element in groups of at least five or a grouping of a plurality of five units, to form the modular block, the connecting units being arranged in two inversely symmetrical parallel rows to form one row and another row, with three of each five units being disposed in one row and the remaining two of each five units being disposed in the other row.

9 Claims, 5 Drawing Sheets

MODULAR TELEPHONE LINE CONNECTING DISCONNECTING AND TESTING BLOCK

FIELD OF THE INVENTION

The invention relates to a modular telephone line block for disconnecting, connecting, cutting and testing the lines.

As used herein, "block" or "connecting block" means a plurality of connecting units between the multipair telephone cable leading to the exchange, and the wire pair serving a subscriber, which are integrally molded and therefore inseparably joined in a fixed arrangement.

As used herein, the term "modular" refers to the ability of systematically interconnecting a plurality of connecting units in a repetitive manner into a modular block until a desired number of modular blocks are integrated in a connection box. Thus, a plurality of connecting units make up a connecting block, and a plurality of connecting blocks comprise a box.

BACKGROUND

The assignee of this application is also the owner of Spanish Utility Model No. 9,400,528 for an Improved Telephone Line Connecting and Testing Module representing the state of the art, in which each connecting unit is a free, separate part that is attached to a standard omega section and has to be connected in place to both the lead in multipair cable to the box and to the subscriber's wire pair, and to the ground connection. Thus, each connecting unit in the assembly is a separate module that permits all the functions of the invention to be performed, namely connecting, disconnecting, testing, and protection. The separateness of the connecting units requires them to be mounted and connected at the connection box, usually in a wiring space or wire room of a building. This is an important factor to be considered due to relative weight of the arrangement and its relation to overall costs.

Furthermore, an undue number of rather lengthy manual operations are required wherever the box is located.

DESCRIPTION OF THE INVENTION

An object of the present invention is to provide an improved solution to the drawbacks of the prior art of separately modulated connecting units.

The present invention is based on the recognition that the separate connecting units can be replaced with an inseparable, integrally formed grouping thereof in a fixed arrangement, of molded connecting blocks.

This basic solution had to be further developed by determining the number of connecting units that should most advisably be grouped in a block, their best arrangement in each block, and the manner in which the separate blocks should be interconnected to provide them in an attached assembly in the connection box. Since each multipair cable has a pair number that is a multiple of 5, and each pair has to be electrically attached to a connecting unit, five units should be integrated into each block. This enables an easier design for grouping the connecting units to allow arrangements of linked blocks that are suitable for clearly and symmetrically completing connection with the number of wire pairs in the cable regardless of whether their number ends in 5 or in 0, i.e., they are odd or even number multiples of 5, since they both require different form solutions for the grouped units and linked blocks.

The groupings and links of the present invention allow the provision of connection boxes that are appropriate for each cable composition. This makes it easier for all boxes to be served with a multipair cable pigtail which is usually of a length standardized by each telephone company. The wire pairs in the cable are all preconnected to the relevant connecting units, and the ground connection is preconnected to either a circuit ground, such as the metallic ground shield of the cable, or to an actual ground connection lead such as grounding rod.

In the present invention, the wire pairs and the ground connection are preconnected on the underside of the blocks, thereby allowing the elimination of conventional upward and downward conductor holding connectors.

The advantages of the modular blocks of this invention include:

adapting the number of connecting units to the number of wire pairs in the network cable entering the connection box;

the connection units are clearly and symmetrically arranged in the modular block, and are adapted to the wire pair number in the lead-in network cable, independently of whether the pair number is an odd or even multiple of 5;

the multipair cables are preconnected to the applicable connecting units that incorporate a cable pigtail of determined length;

the ground connections of each connecting unit are preconnected to either a circuit ground or to an actual ground connection;

substantial savings are accomplished compared to the known modules, since preconnection of pairs renders their displaceable conductor holders unnecessary;

labor is saved since the preconnection of pairs renders connections to blocks unnecessary in the field; and space is saved because of elimination of the wire pair holders, which cuts down on the size of the unit, and thus the same number of units can fit into a smaller or a same size box, or a conventional box can accommodate more units.

BRIEF DESCRIPTION OF THE DRAWING

To provide a more complete description and contribute to the understanding of the formal, structural and functional characteristics of this invention, the enclosed drawing shows various aspects of preferred embodiments of the present invention, wherein.

DETAILED DESCRIPTION

Figure 1:
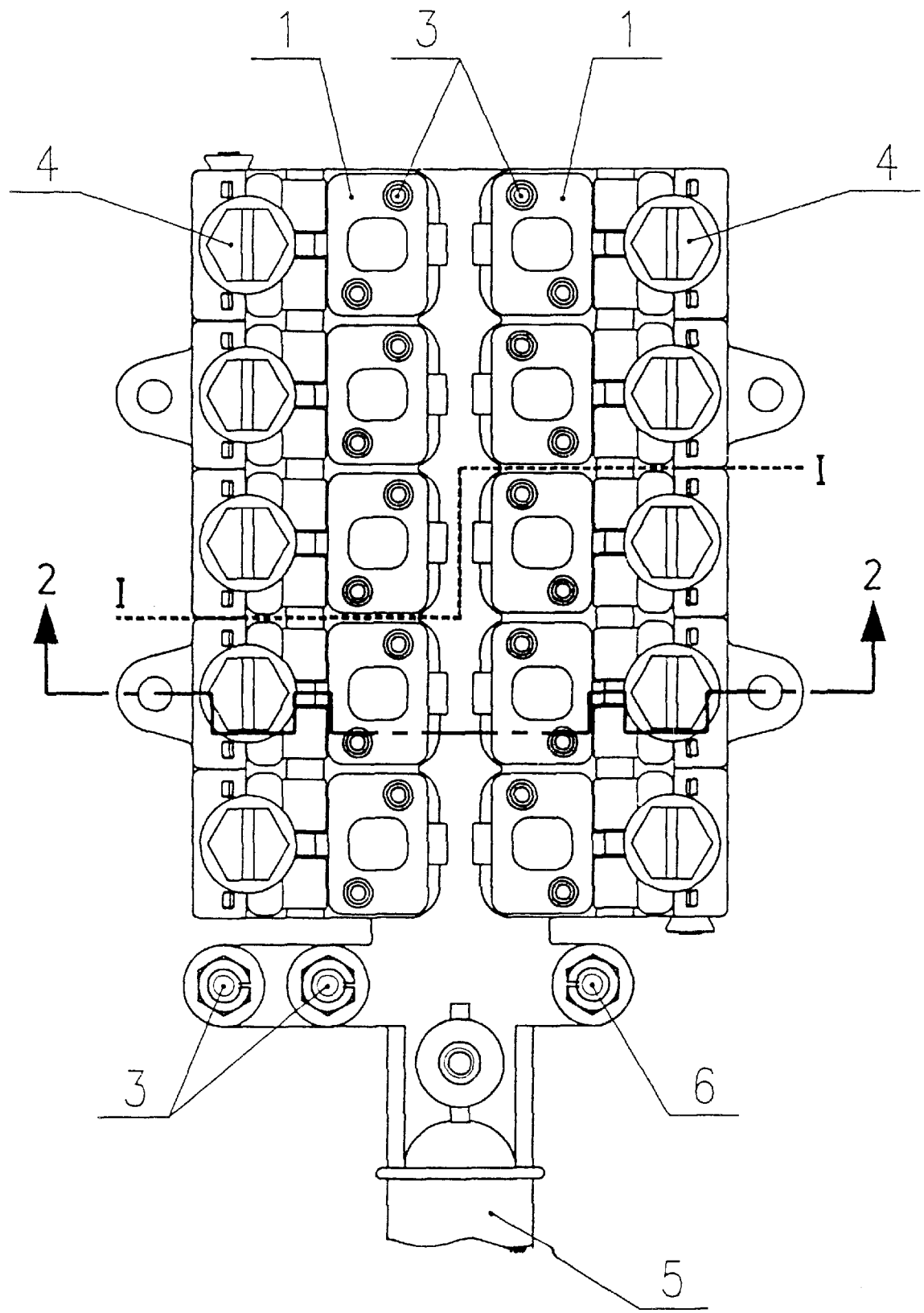
FIG. 1 is a top plan view of two modular connecting blocks linked along the Z-shaped broken line, i.e., representation of the connecting line B-B', each block having five connecting units, or a cable containing 10 wire pairs.
Figure 2:
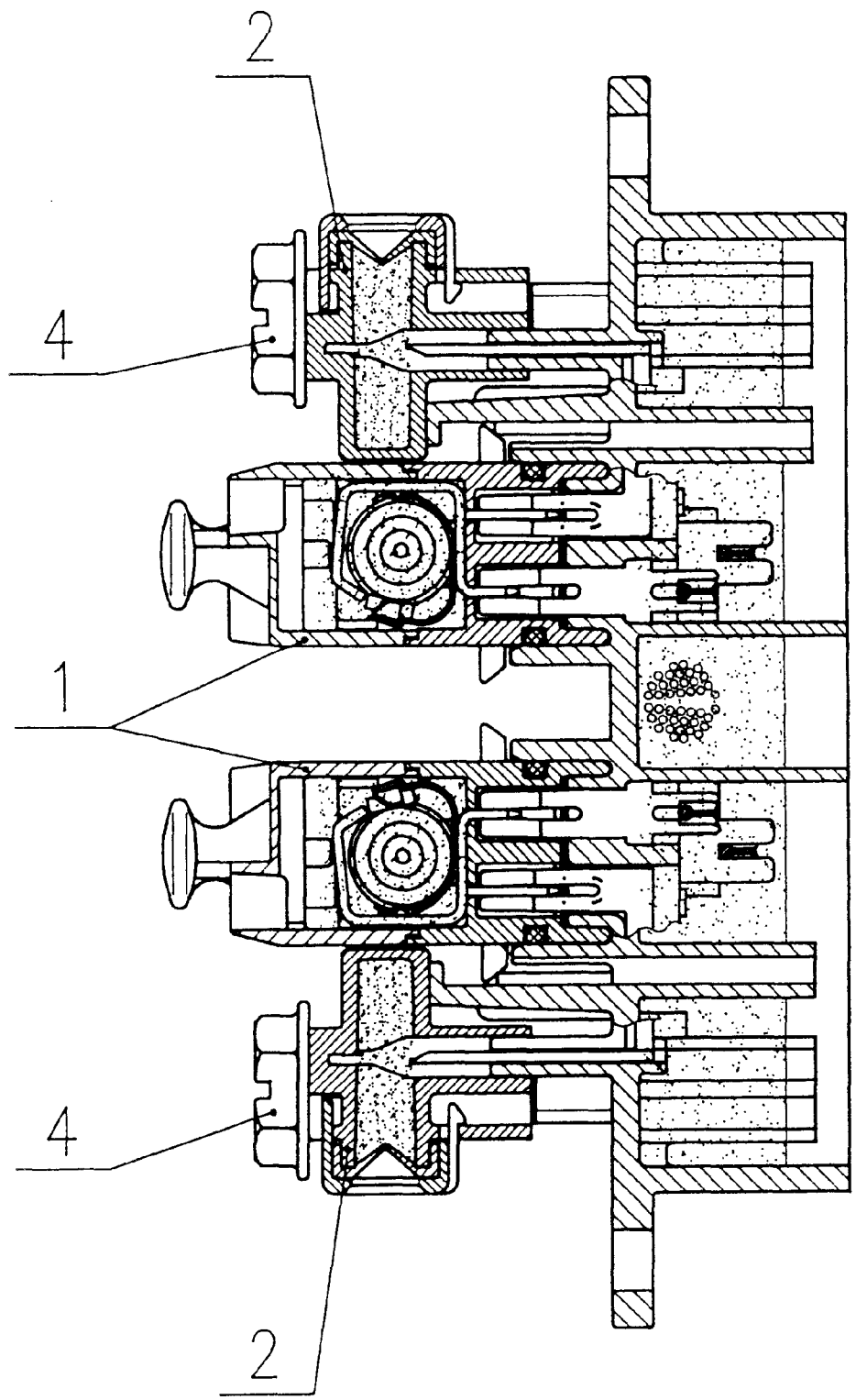
FIG. 2 is a cross-sectional of view of the groupings of connecting blocks of FIG. 1, taken along the line A—A of FIG. 1.

FIGS. 1 and 2 show connecting units having a removable element 1 and a subscriber lead-in conductor holders 2.

Due to its pentapolar contact arrangement, the contents shown in FIG. 1 of a connecting box have two lead-in-, two subscriber-, and one central ground terminal. Each removable element 1 can contain optional electronic components connectable in series such as a frequency filter, PTC variable resistors, or in parallel such as a gas discharger or thyristor and can also be provided without any such other accessory. In the latter case, the connection box and it contents simply act as a continuity supplying or disconnecting unit, while permitting line tests to be made without the line being removed. Each line can be reached by unit tester terminals that can be accessed through hollow turrets 3. The lead-in conductor holder 2 receives and connects or disconnects the end of each subscriber wire lead-in by actuation of a central screw 4. These functional characteristics are all disclosed in Spanish Utility Model 9,400,528.

The essential feature of the aforesaid Spanish Utility Model 9,400,528 is the grouping of a plurality of connecting units to make up interconnectable, molded modular blocks.

Five is the optimum number of units in each block, to be adapted to the customary cables which contain a multiple of 5 wire pairs. The units are arranged in the blocks in two parallel rows, with inverse or specular symmetry about the central longitudinal axis of the block assembly, the removable elements 1 lying closest to such axis and the conductor holders 2 lying more outwardly.

Since there is an odd number of units in each connecting block, the two rows of units are not the same, one row having three units and the other row containing two units in each block. This allows in this embodiment of the present invention two identical blocks of five units to be connected in an inverted position, juxtaposing each of the units projecting from each block and thus forming sets of ten units.

The first modular block in each set has an entrance nozzle 5 for the multipair cable, and a group of terminals, having one pilot pair of main terminals 3a for connecting a tester for testing, and for connecting to the exchange such as for field communications, and a ground connecting terminal 6 for testing the quality of the ground connection.

The arrangement of such group of terminals differs depending on whether the numbers of cable pairs in a box is an odd or even multiple of five. The closed and complementary configuration of the set of two blocks (10 connecting units) requires the group of terminals to be located outside the paired rows of units, in a separate row, as shown in FIG. 1.

Figure 4:
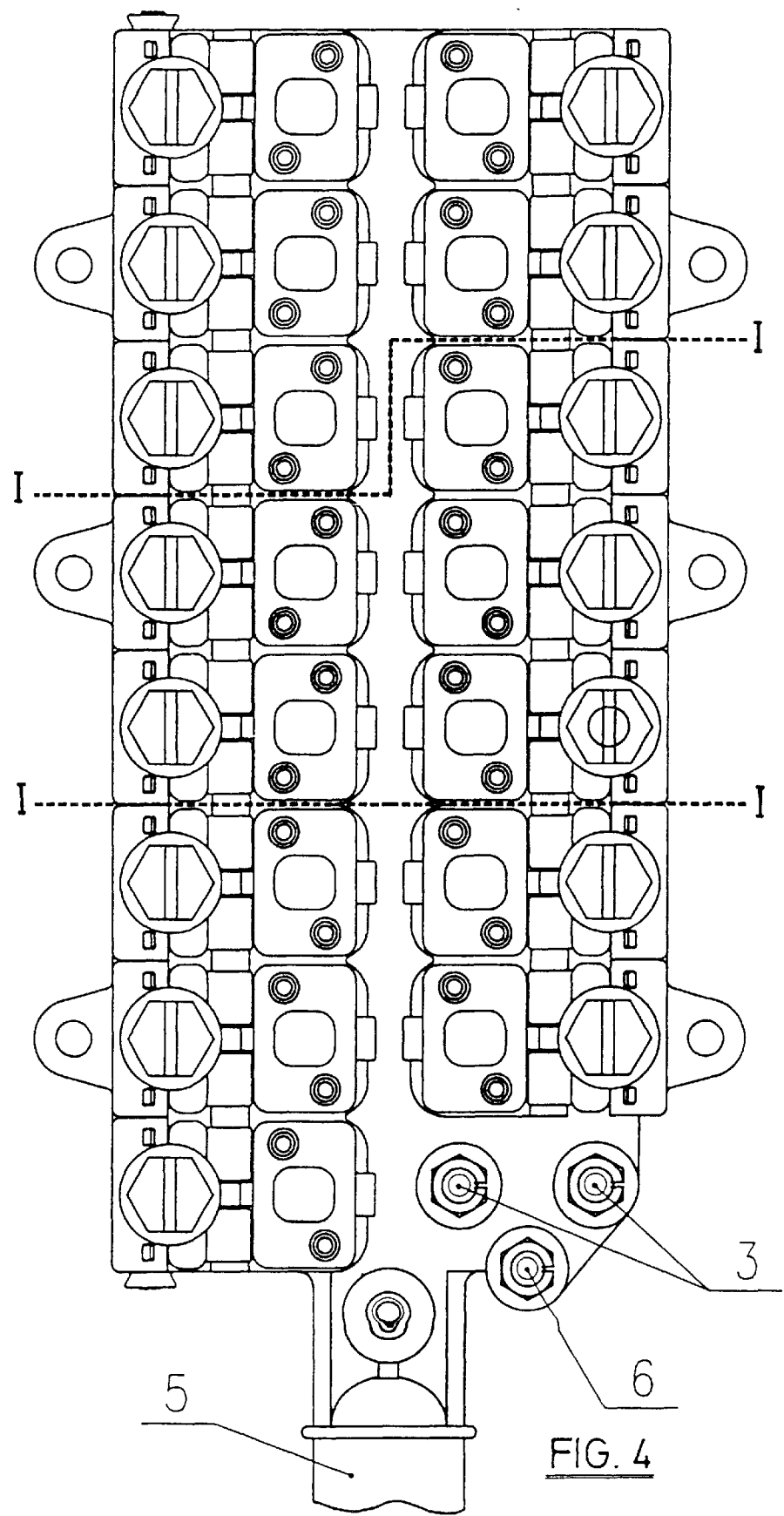
FIG. 4 is a top plan view of a modular block embodiment containing 15 connecting units, with a straight rather than broken border for the cable entrance.
Figure 5:
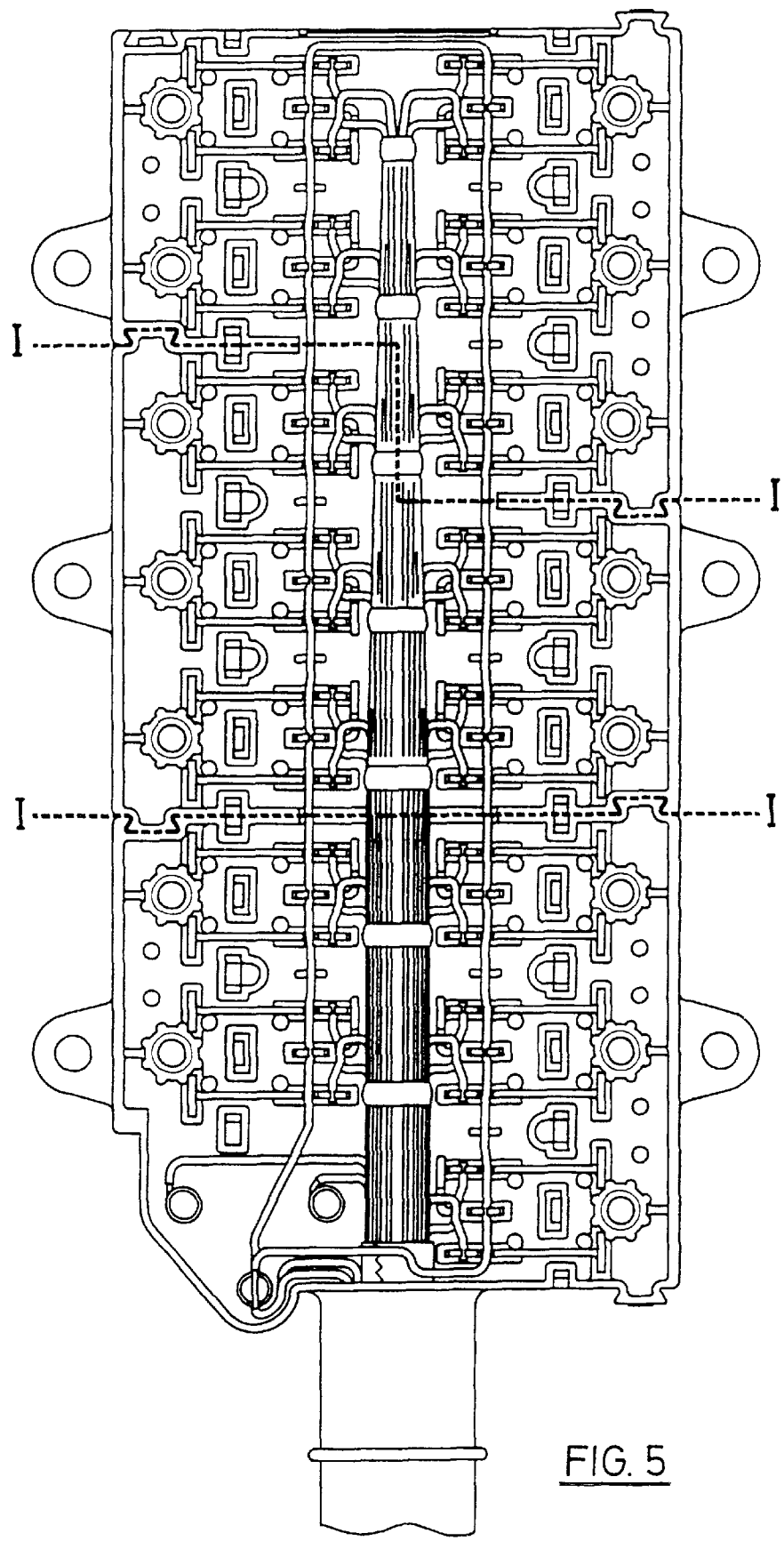
FIG. 5 is a bottom plan view of the connecting block of FIG. 4, showing the preconnections.

A grouping of two blocks as shown in FIG. 1 can be linked to make up a set of 15 connecting units, which, by consecutive juxtapositions, is suitable for joining any odd multiple of five wire pairs, as shown in FIGS. 4–5. In the case of an uneven multiple of five units, the inverted position of the first block allows the integration of the next block to the first block, and a free space becomes available between the parallel rows of units, as shown in FIG. 4, for accommodating the group of terminals in that space in one of the rows of units. This staggered arrangement of the units assists in the addition of further blocks, such as of linked blocks of 10 units each. Thereby, if desired, consecutive juxtapositions of any uneven multiple number of blocks of units of five can be used to make up the contents of different size boxes.

Figure 3:
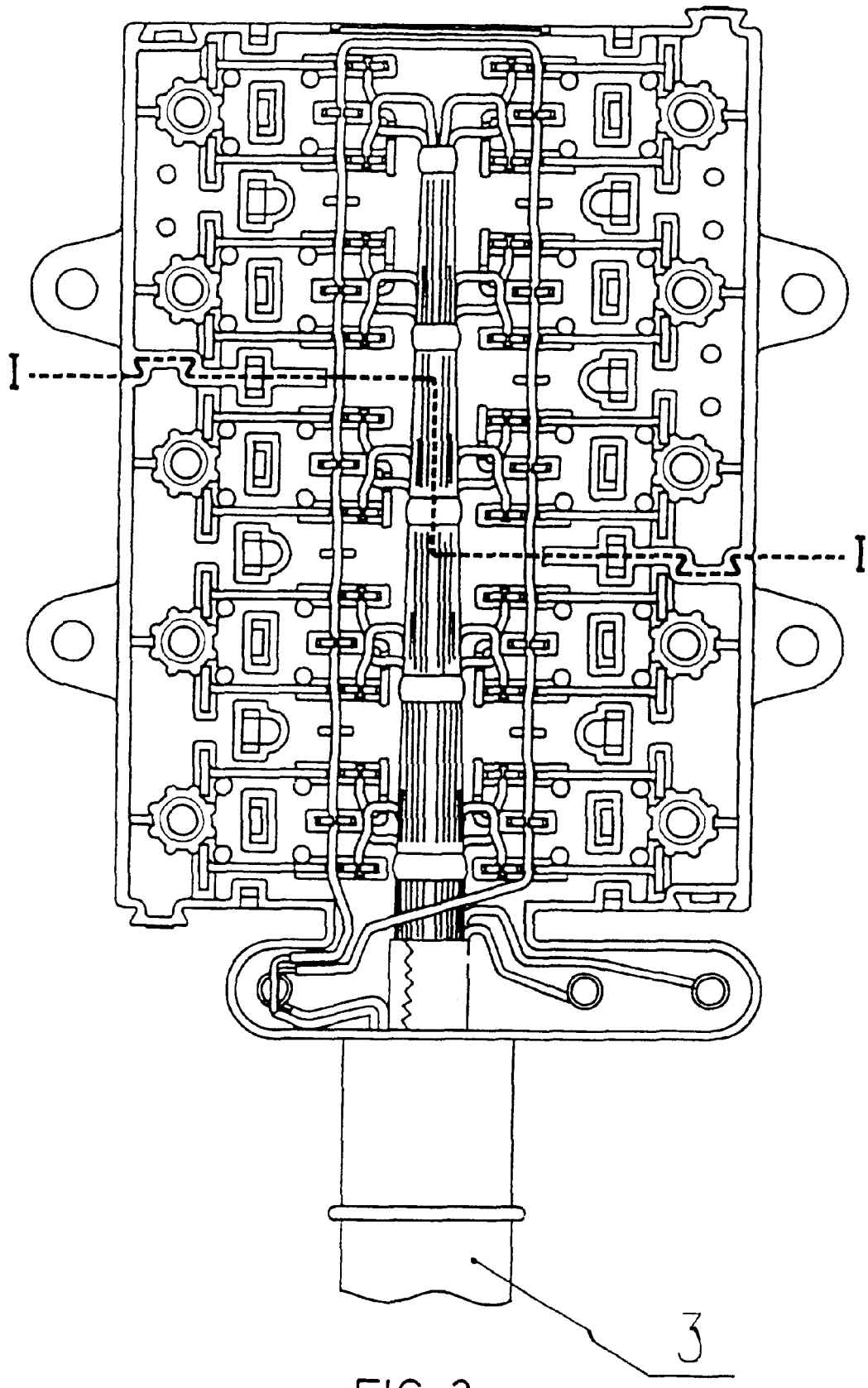
FIG. 3 is a bottom plan view of the grouping of connecting blocks of FIG. 1, showing the preconnections.

The wire pairs of the lead-in cable are preconnected to the connecting units and the latter units are also preconnected to the ground terminal 3 circuit and grounding on the underside of the blocks, as shown in FIGS. 3 and 5.

This system makes the conventional pair of conductor holders unnecessary, with the aforementioned advantages of cost savings of materials, labor and space.

The cable pairs, with their pigtails inserted in the first block through the entrance nozzle 5, are connected to the relevant terminals in the various units, from right to left.

The grounding circuit surrounds the bottoms of the blocks, connecting with the central poles in each unit, with the ends of the ground connections being welded to a ground terminal and to the metallic shield of the lead-in cable, to allow the grounding method required by each telephone company to be chosen either through the cable proper or by means of a separate actual ground connection.

The complete scope of the present invention is defined by the appended claims.

I claim:

1. A modular connecting block for connecting, disconnecting and testing a network telephone cable, which comprises
   (i) a plurality of connecting units each for directly connecting an insulated subscriber wire pair to or for disconnecting said wire pair from a pair of said network telephone cable,
   (ii) a plurality of removable elements for manually establishing or cutting said direct connection,
   (iii) a ground connection for said removable elements,
   (iv) means for testing said wire pairs and said ground connection, and
   (v) five, or a plurality of said five connecting units including said removable elements for connecting subscriber wire pairs in groups of five or a grouping of a plurality of five units, to form the modular block, said connecting units being arranged in two or a plurality of successive inversely symmetrical parallel rows to form at least one row and at least another row, with three of each five units being disposed in one row and the remaining two of each five units being disposed in the other row.

2. A connection box containing a first and a second modular block according to claim 1, wherein one of said three units of the first modular block is juxtaposed in the box with another of the three units of the second modular block, said unit of said second modular block being in an inverted position relative to said unit in said first modular block, to form a set of ten connecting units, wherein said first and said second blocks are juxtaposed to each other along a Z-shaped notional line.

3. The connection box of claim 2, wherein said box comprises an even number of connecting blocks, said even number being at least four.

4. The connection box of claim 2, wherein said box comprises an odd numbers of connecting blocks.

5. The connection box of claim 2, wherein the modular blocks in said box are attached to each other.

6. The connection box of claim 3, wherein the modular blocks in the box are attached one to another.

7. The connection box of claim 4, wherein the modular blocks are attached one to another.

8. A connection box containing an even number or odd number plurality of modular blocks according to claim 1, wherein one of the three units of one block is juxtaposed in the box with another of the three units of an adjacent modular block, said juxtaposed units being in an inverted position relative to each other, each two blocks form a set of ten connecting units, wherein the blocks are juxtaposed to each other along a Z-shaped notional line, the box having an entrance nozzle for a multipair cable connecting the box to a telephone exchange, a group of terminals comprising a pilot pair of connecting terminals for testing and for connecting for communication, and a grounding test terminal, with said group of terminals being disposed in the box outside of the parallel rows of connecting units when an even number multiple of five units is contained in the box, and said group of terminals being disposed within one of said parallel rows of connecting units when an odd number multiple of five units is contained in the box.

9. The connection box of claim 8, wherein said units are preconnected to wires for field connection to said multipair cable.

\* \* \* \* \*